United States Patent [19]

Mettier

[11] Patent Number: 4,745,255
[45] Date of Patent: May 17, 1988

[54] METHOD AND APPARATUS FOR WELDING CURRENT REGULATION FOR A RESISTANCE WELDING MACHINE

[75] Inventor: Paul Mettier, Bremgarten, Switzerland

[73] Assignee: Elpatronic AG, Switzerland

[21] Appl. No.: 904,890

[22] Filed: Sep. 8, 1986

[30] Foreign Application Priority Data

Sep. 10, 1985 [CH] Switzerland ................. 3892/85

[51] Int. Cl.[4] ............................................. B23K 11/24
[52] U.S. Cl. ..................................... 219/110; 219/114
[58] Field of Search ......................... 219/110, 109, 114

[56] References Cited

U.S. PATENT DOCUMENTS

| | | | |
|---|---|---|---|
| 3,194,939 | 7/1965 | Hill | 219/110 |
| 3,335,258 | 8/1967 | Barnhart et al. | 219/110 |
| 4,343,980 | 8/1982 | Stanna et al. | 219/110 |
| 4,516,008 | 5/1985 | Jones | 219/109 |

FOREIGN PATENT DOCUMENTS

60-115379 6/1985 Japan .................... 219/110

852475 8/1981 U.S.S.R. ............................. 219/110

Primary Examiner—Clifford C. Shaw
Attorney, Agent, or Firm—McCormick, Paulding & Huber

[57] ABSTRACT

A method and arrangement are described for regulating the welding operation in a resistance welding machine by sensing the welding current and controlling the welding time. A first integrator (20) determines the desired total energy to be supplied to a welding spot from a desired welding current preset by means of a function generator (18) and a preset welding time. An integrating device (25) connected to the welding-current sensor (14) determines the actual energy supplied. A comparator (24) compares the desired total energy with the actual energy in order to switch off the welding current by means of a start/stop module (30) in the event of equality between desired value and actual value. In this manner, fluctuations in the supply voltage are compensated by lengthening or shortening the time during which energy is supplied to the welding spot in order to ensure the quality of the welding from one welding spot to another.

8 Claims, 2 Drawing Sheets

METHOD AND APPARATUS FOR WELDING CURRENT REGULATION FOR A RESISTANCE WELDING MACHINE

The invention relates to a method of regulating the welding operation in a resistance welding machine by sensing the welding current and controlling the welding time. In addition, the invention relates to an arrangement for carrying out this method, having a welding-current sensor as well as having an operation control device and a start/stop module to control the welding time.

It is known from the U.S. Pat. No. 3,586,815 to control the duration of the welding current in a welding cycle by sensing a preselected resistance in the welding-current circuit between the welding electrodes. In earlier welding systems wherein a predetermined number of pulses, which can be preset, is counted and the welding time is ended when this number of pulses is reached, it is not possible to take into consideration variations in the materials to be welded, in the pressure exerted on the work to be welded, in the state of the surface, in the supply voltage etc. In order to overcome this disadvantage, therefore, according to the '815 patent, the duration of the welding time is automatically controlled during which electrical energy is supplied to the welding electrodes. For this purpose, the electrode voltage and the welding current are sensed and used in order to determine therefrom the resistance between the welding electrodes and the welding is ended as soon as a preselected variation in the welding resistance is found. Thus it is necessary to determine two parameters, namely the voltage and the current, and to ascertain from them the resistance between the welding electrodes. In this manner, it is intended to eliminate factors which might have a disadvantageous influence on the quality of the welding result, such as variations in the supply voltage for example. Determining two parameters in order to ascertain a third parameter is a method involving errors which additionally suffers from the disadvantage that certain conditions may alter during the welding which may cause a variation in the sensed voltage or in the sensed current without a correlative variation in the welding resistance. It is therefore necessary to vary the duration of the sensing time in accordance with certain electrical conditions of the load. It is therefore the amplitude of the load current which is sensed in particular and the sensing time is varied in accordance with variations in the load current sensed, starting from the assumption that a large load current, for example, is attributable to a rise in the supply voltage. Additional expense must therefore be borne for variations which, although they have an effect on the voltage sensed or the current sensed, nevertheless do not cause any variation at all in the resistance.

The U.S. Pat. No. 4,289,951 describes a power-factor monitoring and control system by means of which distortions in the waveform of the supply voltage, which are caused by a plurality of welding devices operated simultaneously on the same supply line and prevent the supply voltage zero crossing from being able to be used as a precise reference point for the time control, are compensated in that variations in resistance are sensed which occur in the secondary winding of a welding transformer during the formation of the weld. By measuring the variation in resistance, which is related to the welding quality, in the secondary winding of the welding transformer and by sensing the variation in the power factor in the primary circuit of the welding transformer, monitoring devices can be avoided in the leads to the welding electrodes. The energy supplied during the welding is then controlled by increasing or decreasing the welding current.

The DE-A- No. 31 13 250 describes a method and a device for monitoring and regulating resistance welding, in order to compensate for variations in such factors as supply voltage, thickness of material and electrode diameter, so as to achieve the desired welding quality without a considerable alteration of the desired welding time. For this purpose, the resistance of the welding projection is monitored in order to regulate the welding current on the basis of a determined ΔR desired value without appreciably influencing the welding time. For this, the resistance values of welding projections and the speed of the variation in resistance during the heating-up phase of the welding are monitored and the resistance values measured are compared with a predetermined desired resistance curve. If the results of the comparison lead to a prescribed welding time which is considerably longer or shorter than the desired welding time, a dynamic alteration in the welding current is effected and hence in the heat generated during the welding. Since, in this case, the resistance of the welding projections is determined from the voltage sensed at the welding electrodes and from the welding current taken from the primary winding of the welding transformer, the same problems result as those which were explained above in connection with the '815 patent.

The DE-A No. 33 10 602 describes a control unit, controlled by microprocessors, for resistance welding machines, wherein the correct ignition time to compensate for fluctuations in supply voltage and disturbances is calculated in order to maintain a constant power during the fluctuations in supply voltage and disturbances. This known control unit is provided only for a singlephase welding machine and involves considerable expenditure on computers.

Finally, the EP-A No. -0 142 582 describes an adaptive spot welding control wherein differences in the welding current which is necessary to achieve an optimum welding are determined in that the variation in time of the resistance is determined during that part of the welding cycle in which the resistance increases. The welding control reduces the welding current if the variation of the resistance in time exceeds a maximum value and increases the welding current if the variation of the resistance in time is less than a minimum value. Thus this control is also based on determining the resistance between the welding electrodes for a corresponding variation in the welding current, which involves the problems explained above. This EP-A No. 0 142 582 also describes problems which arise in time-adaptive welding controls and makes the criticism that such time-adaptive controls are not suitable to permit the welding of steel alloys varying within wide limits, with the same setting of the welding current. The welding control known from this is therefore so constructed that it is in a position to select automatically an optimum welding current or an optimum schedule of the welding current immediately after electrical energy has been supplied to the electrodes and the variation in time of the resistance of the workpiece has been determined. Although this can partially counterbalance the problems which are associated with determining the resistance from two sensed parameters, nevertheless it involves additional expense which would only be justified in the case of correspondingly expensive welding machines. In practice, this additional expense is usually not justified because the welding-machine operator will select the desired curve (for example of the current or of the resistance over the time) corresponding to the material to be welded, appropriately before the first welding.

The prior art represented in chronological sequence above shows that the problem that the welding current is disadvantageously influenced by fluctuations in the supply voltage has already been recognized and that attempts have been made to overcome this problem by readjusting the welding current and/or the welding time in accordance with fluctuations in the supply voltage. The best solution would be to allow the welding current to follow the desired curve precisely in time. This means heavy expenditure on computers, however, which is only justified in the case of large and expensive welding machines. In addition, it is a disadvantage of the prior art that recourse is had to determining the welding resistance for the readjustment of the welding current and/or of the welding time.

SUMMARY OF INVENTION

It is the object of the invention to improve a method and an arrangement of the type mentioned at the beginning so that, during spot welding, the quality of the welding can be ensured more precisely in a less expensive manner and so as to be reproducible from one welding spot to another.

According to the invention, this problem is solved by the steps:

(a) Presetting the desired welding current $i_S$ and determining the desired total energy to be supplied from the desired-value integral $\int i_S^2 dt$ over a given welding time $t_R$, (b) Measuring the actual welding current $i_I$, (c) Determining the actual energy supplied from the actual-value integral $\int i_I^2 dt$, (d) Comparing the actual energy supplied with the desired total energy and, as soon as the actual energy coincides with the desired-value integral, (e) Switching off the welding current, (f) Repeating the steps (a)–(e)

or by a first integrator to determine the desired total energy to be supplied, from a desired welding current preset by means of a function generator and from a preset welding time, by an integrating device connected to the welding-current sensor to determine the actual energy supplied, and by a desired total energy/actual energy comparator, connected to the first integrator and the integrating device to switch off the welding current by means of the start/stop module on equality between desired value and actual value by overriding the operation control device.

Although the welding current, which is influenced by fluctuations in the supply voltage and other factors (rust between metal sheets to be welded, fluctuations in the pressing force and in the thickness of the material, commutation losses because of saturation in the welding transformer etc.) is sensed by the method and the arrangement according to the invention, as in the prior art, nevertheless, in contrast to that, according to the invention it is not the current which is regulated but the energy supplied, which results from the integral of the welding current and the welding time. Thus the amount of energy supplied and hence the amount of heat which flows into the welding spot is regulated. For this purpose, according to the invention, the welding time is shortened or lengthened in comparison with the preset welding time, according to whether the welding current exceeds or drops below what was preset in the form of a desired curve, so that the desired total energy to be supplied, which is preset by the area below the desired curve, is equal to the actual energy supplied which is given by the area below the welding-current curve actually followed. It is true that by this means, welding times result, according to the fluctuation in the supply voltage or the like, which differ from the preset welding time, but since such fluctuations will occur both in the positive and in the negative direction, both shorter and longer welding times will result so that, on the average, no appreciable exceeding of the sum of the preset welding times has to be reckoned with. Longer welding times will only be of any significance at all during production-line welding of workpieces following immediately one behind the other or during resistance seam welding wherein the seam consists of welding spots following one another immediately. In a spot welding machine or projection welding machine wherein periods of handling time between the individual welding spot have to be included in the planning in any case, extensions of the welding time, which in any case would only be in the microsecond range, are negligible.

In the development of the invention, the measurement of the actual welding current is effected in fixed periods of time for which the period of 500 μs is preferably used which is preset in a three-phase spot welding machine with rectification at the primary or secondary side, wherein each welding impulse consists of individual projections corresponding to the individual phases R, S, T, which are given by the mains frequency of 50 Hz. As a result of the fact that the actual energy supplied is determined for each measured current over a period of 500 μs, the moment when the actual energy supplied is equal to the desired total energy to be supplied can be determined in good time. Although the actual-value integrals of each measuring period are cumulatively stored and the balance is compared with the desired total energy each time, nevertheless a sample and hold circuit or the like, with continuous time counting, may, for example, also be used for this purpose instead. In addition, the A/D converter used in this development of the invention may be omitted if a digital welding-current sensor is used instead of the analog welding-current sensor presupposed.

In the development of the invention according to, the welding time for one welding spot is preferably selected as the preset welding time when it is a question of single-impulse welding without current rise and/or current drop. In the case of single-impulse welding with current rise and/or current drop, the area below the desired welding-current curve over the welding time is divided into component areas and a welding time which is part of the preset total welding time is then allocated to each component area. For single-impulse welding with current rise and current drop, three component areas would appropriately be selected, one for the time of the current rise, one for the time of constant welding current and one for the time of the current drop. For single-impulse welding with a current program, wherein the current acts in various strengths, for example as a welding current and post-heat current with an unaltered power setting, in the development of the invention, following on the switching off of the welding current, the desired post-heat current is set as the new desired current and the post-heat time is controlled instead of the welding time actually allocated to the welding current by definition see DIN 44753, pages 8-10). The terms "welding time" and "welding current" used in the specification and in the claims therefore include, in general, every current time occurring during the welding (that is to say preheat time, welding time or post-heat time) and every current supplied to the welding spot (that is to say preheat current, welding current or post-heat current).

In the development of the invention, the adjustment-value table module contains, for example, a table for the conversion of the desired welding-current values preset by the desired welding current curve $i_S = f(t)$ into corresponding operating angles for the adjustment of the supply voltage corresponding to this welding current.

Examples of embodiment of the invention are described in more detail below with reference to the drawing.

DESCRIPTION OF THE PREFERRED EMBODIMENT

Figure 1:
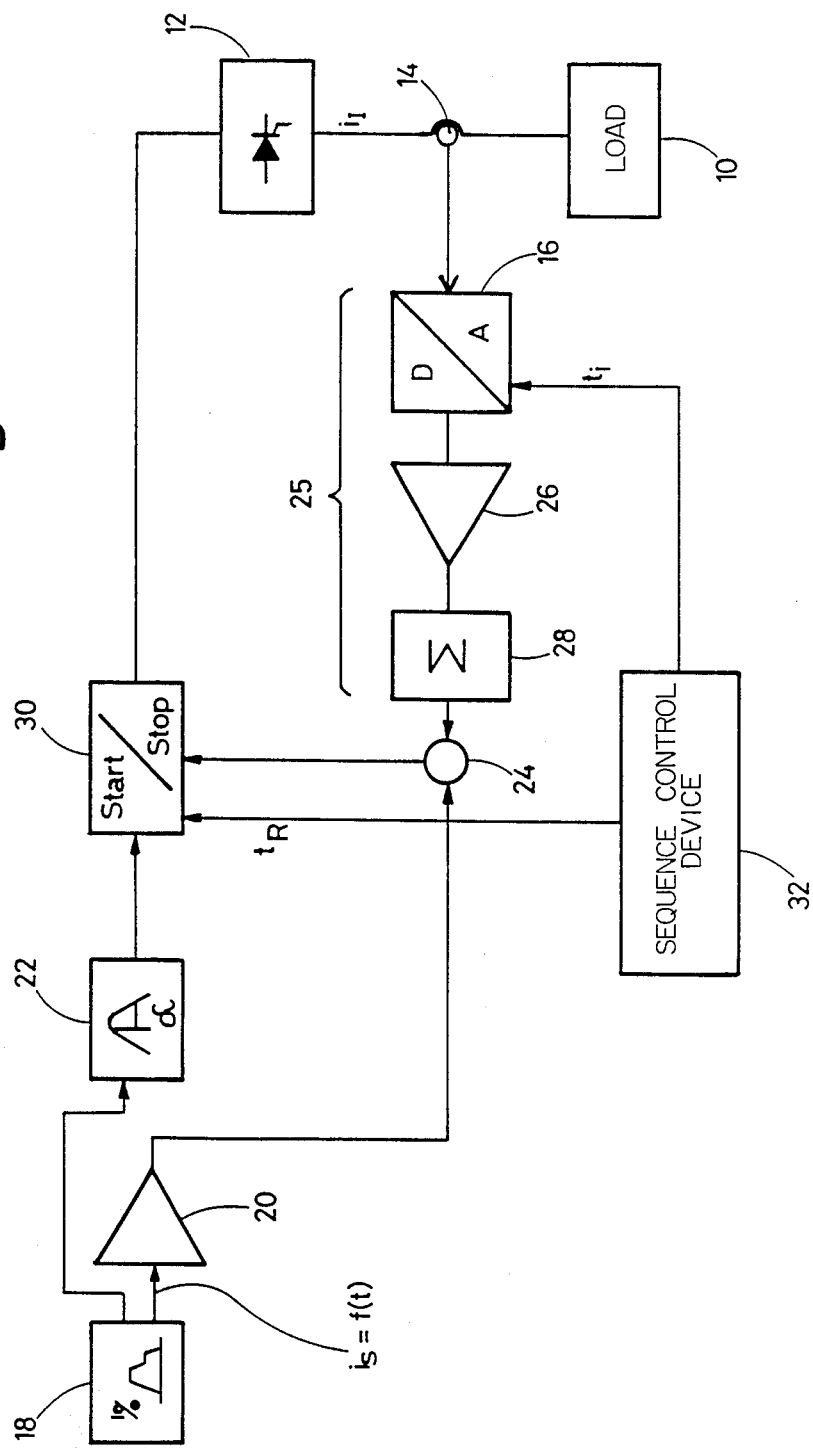
FIG. 1 shows a block circuit diagram of an arrangement according to the invention for regulating the welding operation in a resistance welding machine and FIGS. 2a and 2b show explanatory diagrams.

FIG. 1 shows a block circuit diagram of an arrangement for regulating the welding operation in a resistance welding machine of which, for the sake of simplicity, only the electrodes, between which the workpieces to be welded are gripped, are indicated generally as the load 10 and a final control element 12 (groups of thyristors), through which positive or negative voltage pulses are supplied to the welding transformer, which is likewise not illustrated. In the following description, it is assumed that the resistance welding machine is a three-phase direct-current spot-welding machine. The input welding current of the load 10 (which current may be the actual welding current, a preheat current or a post-heat current), is measured by a welding-current sensor 14 which, in the example of embodiment illustrated, may be a current transformer although a digital current sensor could also be used instead in which case an A/D converter 16 following the current sensor could be omitted.

Figure 2A:
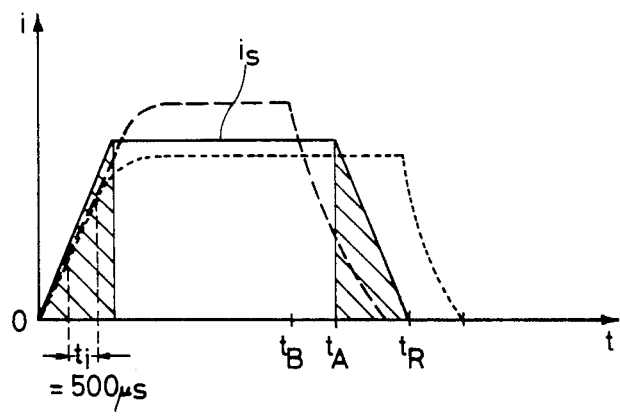

A function generator 18, which can be set by an operator, supplies the arrangement with the desired curve of the welding current $i_S = f(t)$. The desired curve suitable for a specific workpiece to be welded is selected by the operator, for example as a result of the fact that a plurality of welding samples are welded with different desired curves and then a decision is reached as to which desired curve is most suitable with reference to a micrograph. In the example of embodiment described here, the power setting at the welding electrodes remains unaltered in each case. The function generator is connected to an integrator 20 which determines the desired total energy to be supplied according to the desired curve, from the desired-value integral $\int i_S^2 dt$ over a preset welding time $t_R$. In FIG. 2a this desired-valve integral corresponds to the area below the curve for $i_S$ illustrated in full lines. The output of the integrator 20 is connected to a comparator 24. Connected to the output of the A/D converter 16 is an integrator 26, the output of which is connected to an accumulator 28. The A/D converter 16, the integrator 26 and the accumulator 28 together form an integrating device 25. The output of the accumulator 28 is connected to a further input of the comparator 24. The output of the comparator 24 is connected to a first input of a start/stop module 30. The output of the function generator 18 is further connected to a look-up table 22, the output of which is connected to a second input of the start/stop module 30. The look-up table 22 comprises a stored table for the conversion of the desired current $i_S = f(t)$ into corresponding phase shift angles $\alpha(t)$. A third input of the start/stop module 30 is connected to an output of a sequence control device 32 through which the former starts and stops the biassing into conduction of the final control element 12 in accordance with the welding timing. A further output of the sequence control device 32 is connected to a timing input of the A/D converter 16 through which this is controlled for periods of 500 $\mu$s which are preset by the mains frequency of 50 Hz during three-phase operation.

The arrangement described above works as follows.

After the square of desired welding current $i_S$, has been integrated over the preset welding time $t_R$ by the integrator 20 so that the desired total energy to be supplied has been determined, this desired total energy is supplied to the comparator 24. The sequence control device 32 actuates the start/stop module 30 so that an actual load current $i_I$, which is equal to the desired current $i_S$ provided no fluctuation in the supply voltage (or any other disturbing influence) occurs, is supplied to the load 10 through the final control element 12. In this case, when the welding time $t_R$ expires (see FIG. 2a), the desired total energy to be supplied and the actual energy supplied to the load 10 are equal so that the output signal of the comparator (error or control-deviation signal) is zero. The comparator 24 therefore does not override the welding cycle signal delivered by the operation control device 32 to the start/stop module 30, so that the welding current is only switched off at the moment $t_A$ so that it dies down to zero by the moment $t_R$, that is to say up to the expiration of the welding time. The rising and falling slopes of the current curve $i_S$ in FIG. 2a are only intended to represent the current rise and current drop taking place in accordance with an exponential function, so that the current pulse illustrated could ideally also be represented as a rectangle. It could also, however, be a question of welding with current rise or current drop in which case the two hatched areas below the rising or below the falling branch of the curve would be treated as separate areas and then the desired amounts energy to be supplied in the two hatched areas and the unhatched area between them would be determined for each of these regions and compared with the corresponding actual energy supplied in the manner described. For the following description, however, it is assumed that the current rise shown and the current drop shown are negligible and that the desired total energy is determined in each case for the total area below the three curves shown in FIG. 2a.

After the supply of current to the load 10 has begun, the actual energy supplied is determined by the integrating device 25 for $t_i = 500$ $\mu$s each time, by integrating the square of the actual current $i_I$ sensed over the time $t_i$, the contributions of actual energy in each period of 500 $\mu$s being added up in the accumulator 28. As soon as the comparator 24 finds, during the comparison of the actual-energy balance supplied with the desired total energy from the integrator 20, that these coincide, it delivers an output signal to the start/stop module 30 which overrides the signal delivered to the start/stop module by the operation control device so that the welding current is immediately switched off at a moment $t_B$. Since it has been assumed in this case that a positive fluctuation in supply voltage (that is to say an increase in supply voltage) has occurred, the moment $t_B$ comes before the moment $t_A$ (breaking off when no fluctuation in supply voltage is present). Since the area below the curve illustrated in broken lines is equal to the area below the curve illustrated in full lines, the total energy supplied to the welding spot corresponds to the desired total energy, the only difference being that this energy has been supplied to the welding spot in a time which is shorter than the preset welding time $t_R$. If the supply voltage fluctuates in the negative direction (that is to say a reduction in supply voltage), the desired total energy is only reached at a moment which is after the moment $t_R$. The switching off of the welding current is therefore effected not at the moment $t_A$ but at a later moment. The output signal zero of the comparator 24 on equality between desired value and actual value only leads to overriding of the sequence control device 32 when this equality is found before or after the moment $t_A$ (that is to say $t_B \neq t_A$). With an ideal rectangular curve of the current pulse $i_S$, $t_R$ and $t_A$ would naturally be identical.

Figure 2B:
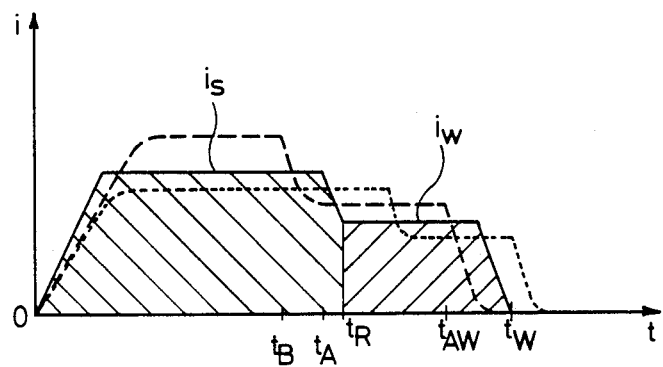

FIG. 2b shows the current curves for welding with a current program according to which the welding time $t_R$ is followed by a post-heat time during which a lower intensity of current is used. The rising and falling slopes of the current curves are again ignored during the following description. In this case, two desired-value integrals are determined, namely for the times $O - t_R$ and $t_R - t_W$ for the preset welding time and the preset post-heat time respectively. If the supply voltage rises above the nominal value, the switching off of the welding current is effected not at the moment $t_A$ but already at the moment $t_B$. The current does not then die down to the post-heat current $i_W$ but, because of the higher supply voltage, remains above this, as the curve in broken lines in FIG. 2b shows. The welding time and the post-heat time are correspondingly shorter so that the current times are each also correspondingly shorter than in the case illustrated in FIG. 2a. In the event of a reduction in supply voltage, the reverse is the case (see the curve in dotted lines in FIG. 2b). In every case, the total energy preset to be supplied for each portion of the current curve is adhered to by appropriate lengthening or shortening of the current time so that the welding spot always receives the desired total energy to be supplied as a result of which the quality of all the welding spots is assured. In practice, the regulating arrangement is designed so that it automatically divides up the area below the current curve according to the current program to be followed.

I claim:

1. A method of regulating a cyclic welding operation in a resistance welding machine which receives alternating input current, and senses welding current and controls the welding time, each welding operation cycle comprising the iterative steps of:
   a. presetting a value of desired welding current $i_s$ and of desired welding time $t_r$;
   b. determining a value for the desired welding energy, from said values of desired welding current using an integral $\int i^2_s dt$ over said desired welding time $t_r$;
   c. applying welding current;
   d. measuring during a time interval ($t_i$) a value of the actual welding current $i_f$, said time interval comprising more than one-half-cycle of the input current;
   e. integrating said measured welding current value with previously measured values of welding current according to an integral $\int i^2_f dt$ to determine an actual welding energy value;
   f. comparing the actual welding energy value with the desired welding energy value; and
   g. switching off the welding current when said actual welding energy value approximately equals said desired welding energy value.

2. The method as claimed in claim 1, wherein said measurement time interval substantially comprises 500 miroseconds.

3. The method according to claim 1 further comprising the steps of:
   presetting a value of desired post-heat current ($i_w$) lower than said welding current value and presetting a value of post-heat time ($t_w$);
   determining a value for the total energy which is the sum of said total welding energy and post-heat energy determined from said values of post-heat current and time using an integral $\int i^2_w dt$;
   applying said post-heat current after said welding current has been switched off;
   measuring during a time interval ($t_i$) a value of actual post-heat current $i_w$;
   intergrating said measured post-heat current value with previously measured values of post-heat current using an integral $\int i^2_w dt$ to determine an actual post-heat energy value;
   comparing the actual post-heat energy value with the desired post-heat energy value and;
   switching off said post-heat current when said actual post-heat energy value approximately equals said disired post-heat energy value.

4. The method according to claim 3 wherein said welding and said post-heat measurement time intervals substantially comprise 500 microseconds each.

5. A regulator for use with a resistance welding machine receiving alternating input current and having a cyclic welding operation, comprising:
   function generator means for presetting a value of desired welding current ($i_s$) and of desired welding time ($t_r$);
   integrating means for determining a value of the desired total welding energy from said values of desired welding current according to an integral $\int i^2_s dt$ over said desired welding time $t_r$;
   means for applying welding current;
   weld current sensor means for measuring during a time interval ($t_i$) a value of the actual welding current ($i_f$) comprising more than one half cycle of the input current;
   means for integrating such said measured welding current value with previously measured values fo welding current according to an integral $\int i^2_f dt$;
   comparator for comparing the actual welding energy value with the desired welding energy value; and
   means for switching off the welding current when said actual welding energy value approximately equals the desired welding energy value.

6. The regulator of claim 5 wherein said presetting means includes a sequence control device and a start/stop module to control the welding time.

7. The regulator of claim 5 wherein said measured welding current integrating device further comprises a second integrator configured with a preceding A/D converter and a following accumulator, and wherein said sequence control device provides signals indicative of a time period ($t_i$) configured with the A/D converter and a welding cycle ($t_r$) configured with the stop module.

8. The regulator of claim 7 wherein said function generator provides output signals to the start/stop mdoule through a look-up table.

* * * * *